United States Patent
Li et al.

(10) Patent No.: US 10,237,464 B2
(45) Date of Patent: Mar. 19, 2019

(54) METHOD AND APPARATUS FOR RECORDING VIDEOS

(71) Applicant: Xiaomi Inc., Beijing (CN)

(72) Inventors: Feiyun Li, Beijing (CN); Fei Xu, Beijing (CN); Yanlu Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 314 days.

(21) Appl. No.: 14/948,516

(22) Filed: Nov. 23, 2015

(65) Prior Publication Data

US 2016/0191780 A1 Jun. 30, 2016

Related U.S. Application Data

(63) Continuation of application No. PCT/CN2015/077883, filed on Apr. 29, 2015.

(30) Foreign Application Priority Data

Dec. 31, 2014 (CN) .......................... 2014 1 0852271

(51) Int. Cl.
*H04N 5/232* (2006.01)
*H04L 29/12* (2006.01)
(Continued)

(52) U.S. Cl.
CPC ..... *H04N 5/23206* (2013.01); *H04L 29/1249* (2013.01); *H04L 29/12471* (2013.01);
(Continued)

(58) Field of Classification Search
CPC .......... H04N 5/23206; H04N 5/23245; H04N 5/772; H04N 5/77; H04L 29/12471;
(Continued)

(56) References Cited

U.S. PATENT DOCUMENTS

2007/0032225 A1* 2/2007 Konicek ........... H04M 1/72513
455/417
2010/0099410 A1 4/2010 Sweeney et al.
(Continued)

FOREIGN PATENT DOCUMENTS

CN 104052971 A 9/2014
CN 104093007 A 10/2014
(Continued)

OTHER PUBLICATIONS

International Search Report of PCT Application No. PCT/CN2015/077883, dated Sep. 28, 2015, issued by the State Intellectual Property Office of P.R. China as ISA (4 pages).
(Continued)

*Primary Examiner* — Nhan T Tran
*Assistant Examiner* — Chriss S Yoder, III
(74) *Attorney, Agent, or Firm* — Finnegan, Henderson, Farabow, Garrett & Dunner LLP

(57) ABSTRACT

A method for recording videos includes receiving first network connection information sent from a mobile terminal and acquiring second network connection information of a bound monitoring device according to the first network connection information. The bound monitoring device is bound with the mobile terminal. The method further includes, when the first network connection information matches the second network connection information, sending a stop instruction to the monitoring device to stop recording.

11 Claims, 6 Drawing Sheets

(51) Int. Cl.
*H04L 12/24* (2006.01)
*H04N 5/77* (2006.01)
(52) U.S. Cl.
CPC .... *H04L 29/12556* (2013.01); *H04L 41/0293* (2013.01); *H04N 5/23245* (2013.01); *H04N 5/77* (2013.01)
(58) Field of Classification Search
CPC ............. H04L 41/0293; H04L 61/2553; H04L 29/1249; H04L 29/12556
See application file for complete search history.

(56) References Cited

U.S. PATENT DOCUMENTS

| | | |
|---|---|---|
| 2012/0236154 A1 | 9/2012 | Schaff |
| 2013/0109404 A1* | 5/2013 | Husney ............ H04W 4/02 455/456.1 |
| 2014/0379882 A1 | 12/2014 | Kim et al. |
| 2016/0105598 A1* | 4/2016 | Zeira ............ H04N 5/23203 348/143 |

FOREIGN PATENT DOCUMENTS

| | | |
|---|---|---|
| EP | 2 107 537 A1 | 10/2009 |
| JP | 08-294101 A | 11/1996 |
| JP | 2007329860 A | 12/2007 |
| KR | 20050100743 A | 10/2005 |
| KR | 1020070051744 | 5/2007 |
| RU | 2013109760 A | 9/2014 |

OTHER PUBLICATIONS

Extended European Search Report for European Application No. EP 15200901.5 from the European Patent Office, dated May 23, 2016.
*How do I use Location Scheduling?: Dropcam Support*, retrieved from http://support.dropcam/com/entries/23600942-How-do-I-use-Location-Scheduling-, dated Sep. 5, 2016, 4 pages.
English version of International Search Report of PCT Application No. PCT/CN2015/077883, dated Sep. 28, 2015, issued by the State Intellectual Property Office of P.R. China as ISA.

* cited by examiner

METHOD AND APPARATUS FOR RECORDING VIDEOS

The present application is a continuation of International Application No. PCT/CN2015/077883, filed on Apr. 29, 2015, which is based upon and claims priority to Chinese Patent Application No. 201410852271.X, filed on Dec. 31, 2014, the entire contents of both of which are incorporated herein by reference.

TECHNICAL FIELD

The present disclosure relates to smart devices and, more particularly, to a method and apparatus for recording videos.

BACKGROUND

Smart cameras can be used for home security. For example, a smart camera can be connected to a router at home through a built-in Wi-Fi (Wireless-Fidelity) module, and a video recorded by the smart camera is uploaded to a server through the router. A user can acquire and view the video stored in the server using a smart phone.

However, when the user is at home, the smart camera still uploads the recorded video to the server, which results in leakage of user privacy.

SUMMARY

In accordance with the present disclosure, there is provided a method for recording videos. The methods includes receiving first network connection information sent from a mobile terminal and acquiring second network connection information of a bound monitoring device according to the first network connection information. The bound monitoring device is bound with the mobile terminal. The method further includes, when the first network connection information matches the second network connection information, sending a stop instruction to the monitoring device to stop recording.

Also in accordance with the present disclosure, there is provided a device for recording video. The device includes a processor and a non-transitory computer-readable storage medium storing instructions. The instructions, when executed by the processor, cause the processor to receive first network connection information sent from a mobile terminal and acquire second network connection information of a bound monitoring device according to the first network connection information. The bound monitoring device is bound with the mobile terminal. The instructions further cause the processor to, when the first network connection information matches the second network connection information, send a stop instruction to the monitoring device to stop recording.

Also in accordance with the present disclosure, there is provided a non-transitory computer-readable storage medium storing instructions. The instructions, when executed by a processor of a terminal, cause the terminal to receive first network connection information sent from a mobile terminal and acquire second network connection information of a bound monitoring device according to the first network connection information. The bound monitoring device is bound with the mobile terminal. The instructions further cause the terminal to, when the first network connection information matches the second network connection information, send a stop instruction to the monitoring device to stop recording.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the present disclosure.

Specific embodiments of the present disclosure are shown by the above drawings, and more detailed description will be made hereinafter. These drawings and text description are not for limiting the scope of conceiving the present disclosure in any way, but for illustrating the concept of the present disclosure for those skilled in the art by referring to specific embodiments.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
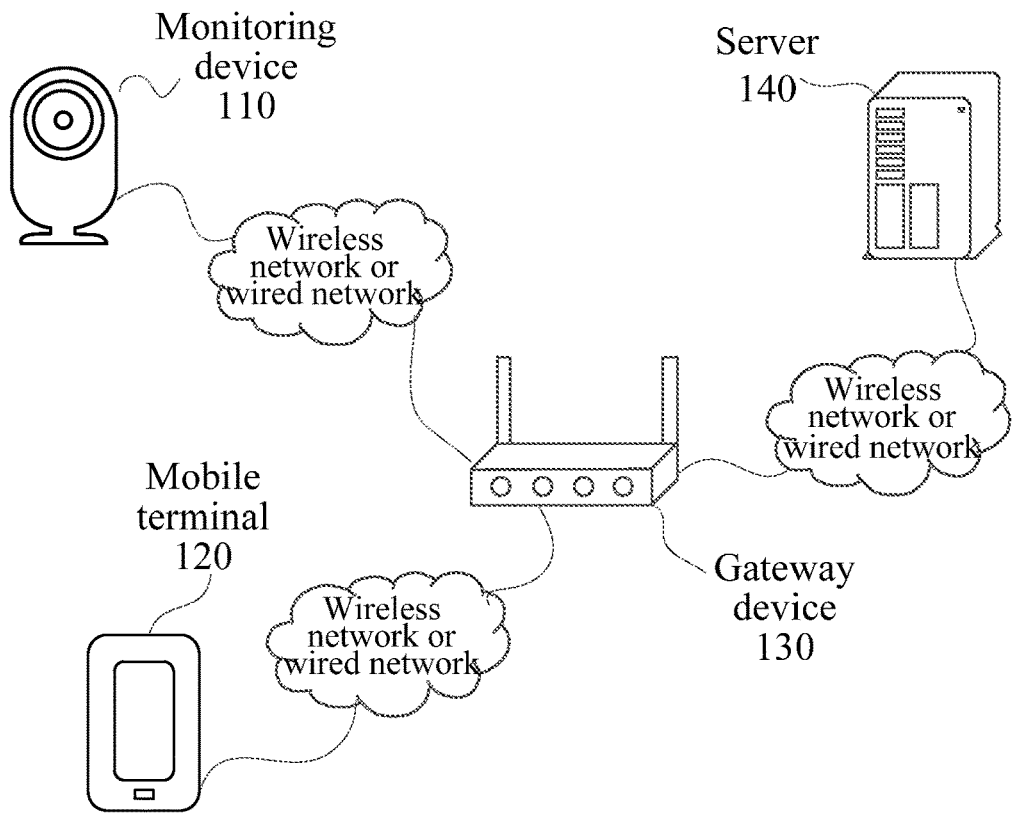
FIG. 1 is a diagram of an implementation environment consistent with embodiments of the present disclosure.

FIG. 1 is a diagram of an implementation environment involved in each embodiment of the present disclosure. The implementation environment includes a monitoring device 110, a mobile terminal 120, a gateway device 130, and a server 140.

The monitoring device 110 has a function of video monitoring. For example, the monitoring device 110 may be a wired or wireless smart camera with a certain computing capability. The monitoring device 110 is connected to the gateway device 130 through a wired or wireless network.

The mobile terminal 120 is an electronic device such as a smart phone, a tablet computer, an ebook reader, a MP3 (Moving Picture Experts Group Audio Layer III) player, a MP4 (Moving Picture Experts Group Audio Layer IV) player, or the like. The mobile terminal 120 is connected to the gateway device 130 through a wired or wireless network.

The gateway device 130 is an electronic device with a data processing capability. The gateway device 130 may be a router, a host enabled to perform a routing function by software, or a network switch having a three-layer switching function.

The server 140 may be a single server, a server cluster composed of several individual servers, or a cloud computing service center. The gateway device 130 and the server 140 are connected to each other through a wired or wireless network.

Methods for recording videos according to the present disclosure can be implemented in the gateway device 130 or in the server 140. In the following description, examples are described with respect to the implementation in the server 140, but they can also be implemented in the gateway device 130.

Figure 2:
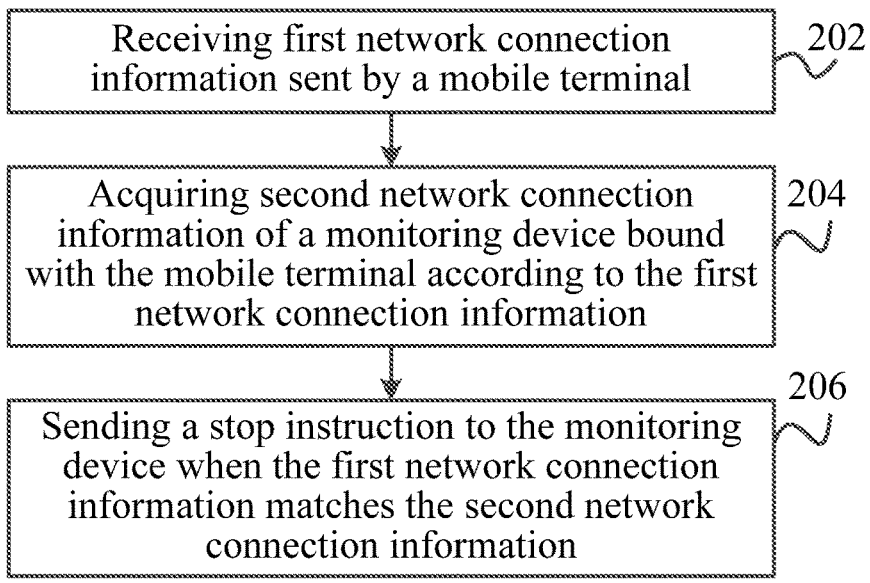
FIG. 2 is a flow chart showing a method for recording videos according to an exemplary embodiment.

FIG. 2 is a flow chart showing a method for recording videos according to an exemplary embodiment. As shown in FIG. 2, at 202, first network connection information sent by a mobile terminal is received. At 204, second network connection information of a monitoring device bound with the mobile terminal is acquired according to the first network connection information. At 206, an instruction of stopping recording, also referred to as a "stop instruction," is sent to the monitoring device when the first network connection information matches with the second network connection information.

Thus, consistent with the present disclosure, whether a user of the mobile terminal is at home is judged according to a network connection situation of the mobile terminal, and the stop instruction is sent to the monitoring device when the user is at home.

Figure 3A:
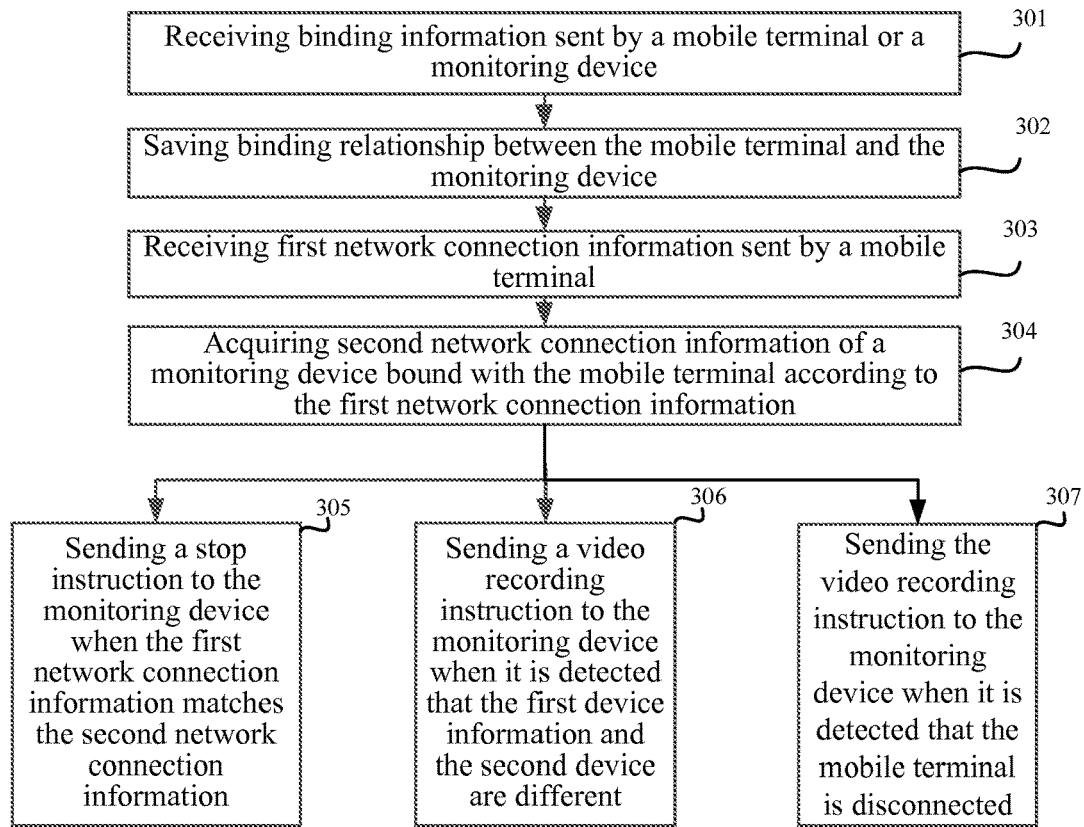
FIG. 3A is a flow chart showing a method for recording videos according to another exemplary embodiment.

FIG. 3A is a flow chart showing a method for recording videos according to another exemplary embodiment. As shown in FIG. 3A, at 301, binding information sent by a mobile terminal or a monitoring device is received. The binding information includes an identification of the mobile terminal and an identification of the monitoring device. A binding relationship between the mobile terminal and the monitoring device is stored in the server according to the identification of the mobile terminal and the identification of the monitoring device carried in the binding information.

In some embodiments, the mobile terminal runs software for managing monitoring devices, also referred to as monitoring device managing software. The user inputs the identification of the monitoring device to be bound in a binding relationship equipment interface. The mobile terminal sends the binding information, which carries the identification of the monitoring device and the identification of the current mobile terminal, to the server according to the identification of the monitoring device. The identification of the monitoring device may be, for example, a MAC (Media Access Control) address of a Bluetooth module in the monitoring device. The identification of the mobile terminal may be, for example, a MAC address of a Bluetooth module or an IMEI (International Mobile Equipment Identity) code of the mobile terminal.

Figure 3B:
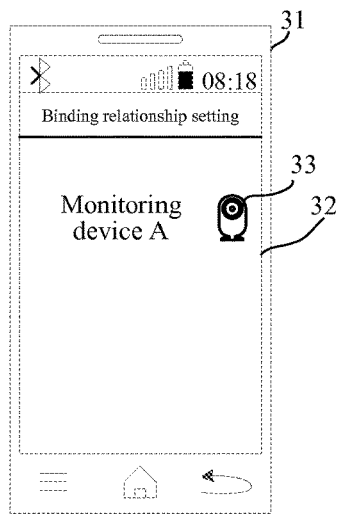
FIG. 3B is a diagram showing an interface of monitoring device managing software according to an exemplary embodiment.

For example, as shown in FIG. 3B, the user starts the monitoring device managing software installed in a mobile terminal 31. The mobile terminal 31 acquires the MAC address of a Bluetooth module in a monitoring device by scanning a QR code on the monitoring device. The monitoring device managing software has a binding relationship setting interface 32. The mobile terminal 31 displays a camera icon 33 on the binding relationship setting interface 32 for the user to select. According to the user's selection, the mobile terminal 31 sends the MAC address of the Bluetooth module and the identification of the current mobile terminal 31 together to a server.

In some embodiments, the user can search nearby monitoring devices by clicking a search button on the binding relationship setting interface of the monitoring device managing software. The nearby monitoring devices are displayed in a monitoring device list. The user selects the monitoring device in the monitoring device list to perform a binding operation. The mobile terminal sends the identification of the current mobile terminal and the identification of the selected monitoring device together to the server. In some embodiments, the mobile terminal sends the identification of the mobile terminal to the monitoring device, and then the monitoring device sends the identification of the mobile terminal and the identification of the monitoring device to the server.

Figure 3C:
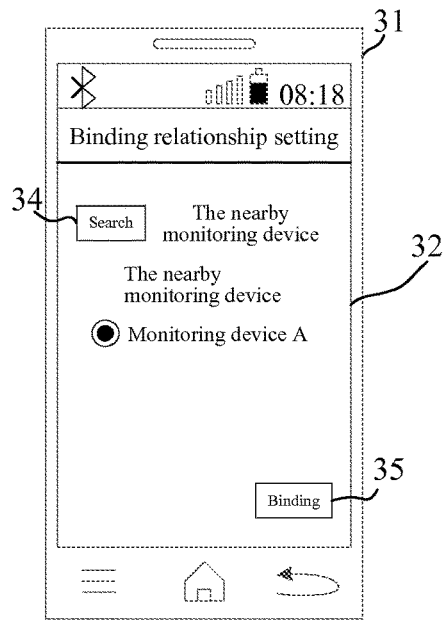
FIG. 3C is a diagram showing the interface of the monitoring device managing software displaying a monitoring device list.

For example, as shown in FIG. 3C, the user clicks a search button 34 on the binding relationship setting interface 32 of the monitoring device managing software to find nearby monitoring devices. In the example shown in FIG. 3C, Monitoring device A is found and displayed in the monitoring device list. The user selects one monitoring device, e.g., Monitoring device A in this example, in the monitoring device list and clicks a binding button 35. The identifications of the mobile terminal and the monitoring device are sent to the server by the mobile terminal or the monitoring device.

Correspondingly, the server receives the binding information sent by the mobile terminal or the monitoring device.

Refer again to FIG. 3A, at 302, the binding relationship between the mobile terminal and the monitoring device is saved. Specifically, after receiving the binding information sent by the mobile terminal or the monitoring device, the server saves the binding relationship according to the identification of the mobile terminal and the identification of the monitoring device carried in the binding information. The binding relationship is saved in a binding relationship table having a table structure as shown in Table I.

TABLE I

| Identification of mobile terminal | Identification of monitoring device |
| --- | --- |
| 00:11:22:AA:BB | 00:11:22:AA:CC |
| 00:11:22:AA:BC | 00:11:22:AA:CD |
| 00:11:22:AA:BD | 00:11:22:AA:CE |

In some embodiments, one mobile terminal may be bound with a plurality of monitoring devices at the same time. In some embodiments, one monitoring device may also be bound with a plurality of mobile terminals at the same time.

At 303, first network connection information sent by a mobile terminal is received.

Specifically, the monitoring device managing software runs as a background process in the mobile terminal and automatically detects the current network connection situation. When the monitoring device managing software detects that the mobile terminal is connected to a Wi-Fi network or switches to another Wi-Fi network, the mobile terminal sends the current network connection information, i.e., the first network connection information, to the server. The first network connection information includes the MAC address and SSID (Service Set Identifier) information of the gateway device to which the mobile terminal is connected.

Correspondingly, the server receives the first network connection information sent by the mobile terminal.

At 304, second network connection information of a monitoring device bound with the mobile terminal is acquired according to the first network connection information.

Specifically, the server acquires the network connection information of the monitoring device bound with the mobile terminal according to the received identification the mobile terminal carried in the first network connection information. The server can acquire the network connection information of the monitoring device by various approaches.

Figure 3D:
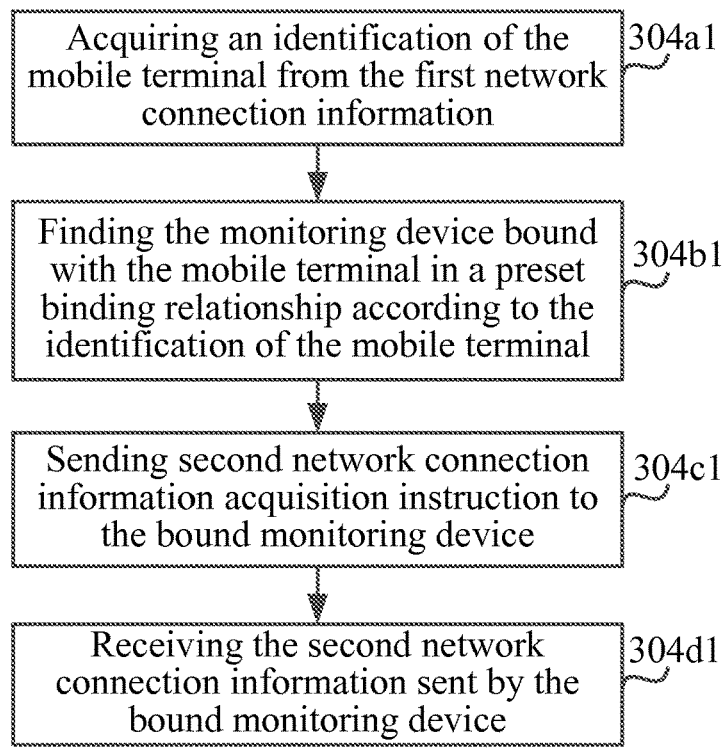
FIG. 3D is a flow chart showing a process of acquiring second network connection information in a method for recording videos according to an exemplary embodiment.

In an exemplary approach, as shown in FIG. 3D, at 304a1, the server acquires an identification of the mobile terminal from the first network connection information. For example, the MAC address of the Bluetooth module of the mobile terminal acquired by the server from the received first network connection information is 00:11:22:AA:BB.

At 304b1, the server finds the monitoring device bound with the mobile terminal in a preset binding relationship according to the identification of the mobile terminal. Specifically, the server finds the identification of the monitoring device from the preset binding relationship. For example, in the binding relationship, the identification of the bound monitoring device that corresponds to the acquired MAC address 00:11:22:AA:BB of the Bluetooth module in the mobile terminal is 00:11:22:AA:CC.

At 304c1, the server sends instruction of acquiring the second network connection information, which is also referred to as a "second network connection information acquisition instruction," to the bound monitoring device. The second network connection information acquisition instruction is used to acquire the current network connection information of the monitoring device.

Correspondingly, the monitoring device receives the second network connection information acquisition instruction and sends the current network connection information, i.e., the second network connection information, to the server. The second network connection information includes the MAC address and the SSID information of the gateway device to which the monitoring device is connected.

At 304d1, the server receives the second network connection information sent by the bound monitoring device. According to the received second network connection information, the server can acquire the information of the gateway device to which the monitoring device is currently connected.

Figure 3E:
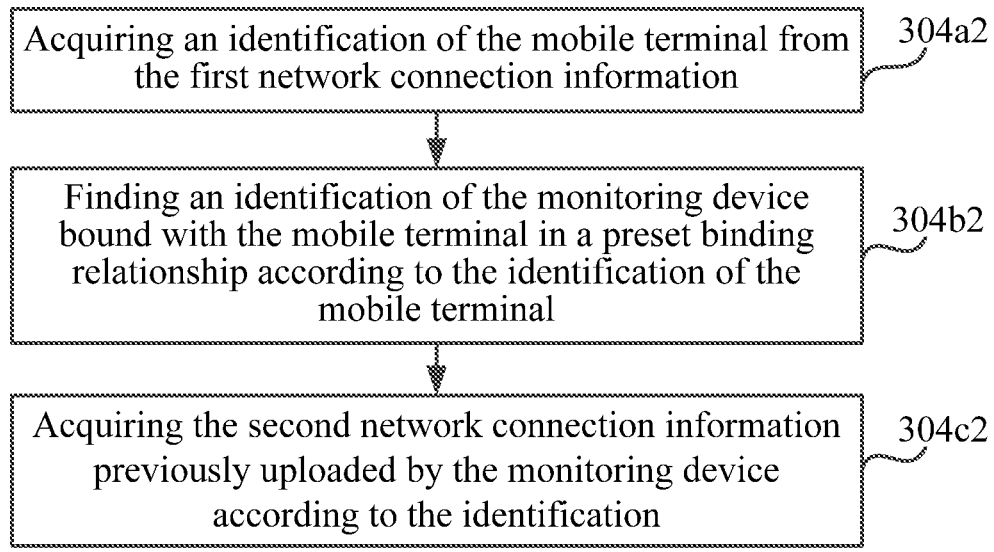
FIG. 3E is a flow chart showing a process of acquiring second network connection information in a method for recording videos according to another exemplary embodiment.

In another exemplary approach, as shown in FIG. 3E, at 304a2, the server acquires an identification of the mobile terminal from the first network connection information. For example, the MAC address of the Bluetooth module of the mobile terminal acquired by the server from the received first network connection information is 00:11:22:AA:BB.

At 304b2, the server finds an identification of the monitoring device bound with the mobile terminal in a preset binding relationship according to the identification of the mobile terminal. For example, in the binding relationship, the identification of the bound monitoring device that corresponds to the acquired MAC address 00:11:22:AA:BB of the Bluetooth module in the mobile terminal is 00:11:22:AA:CC.

At 304c2, the server acquires the second network connection information previously uploaded by the monitoring device according to the found identification of the bound monitoring device. In this example, a monitoring device monitors network connection information. When the monitoring device is initially connected to a gateway device or detects that the network connection information changes, the monitoring device acquires the current network connection information, and uploads it to the server as the second network connection information. In some embodiments, the monitoring device uploads the current network connection information to the server every certain interval.

The server saves the network connection information sent by the monitoring device to a second network connection information table, and updates data in the table in real time. An example of the second network connection information table is shown in Table II.

TABLE II

| Identification of monitoring device | Network connection information |
|---|---|
| 00:11:22:AA:CC | SSID information: SSID A<br>MAC address: MAC A |
| 00:11:22:AA:CD | SSID information: SSID B<br>MAC address: MAC B |
| 00:11:22:AA:CE | SSID information: SSID C<br>MAC address: MAC C |

According to the found identification of the monitoring device bound with the mobile terminal, the server searches for the current network connection information of the monitoring device. For example, the identification of the monitoring device bound with the mobile terminal found by the server is 00:11:22:AA:CC, and the current network connection information of the monitoring device found in the second network connection information table is "SSID information: SSID A, MAC address: MAC A".

Referring again to FIG. 3A, at 305, a stop instruction is sent to the monitoring device if the first network connection information matches the second network connection information. Specifically, the server checks the received first network connection information and the acquired second network connection information. If the first network connection information matches the second network connection information, then it is determined that the mobile terminal and the monitoring device are connected to the same gateway device, and the server sends the stop instruction to the monitoring device.

Figure 3F:
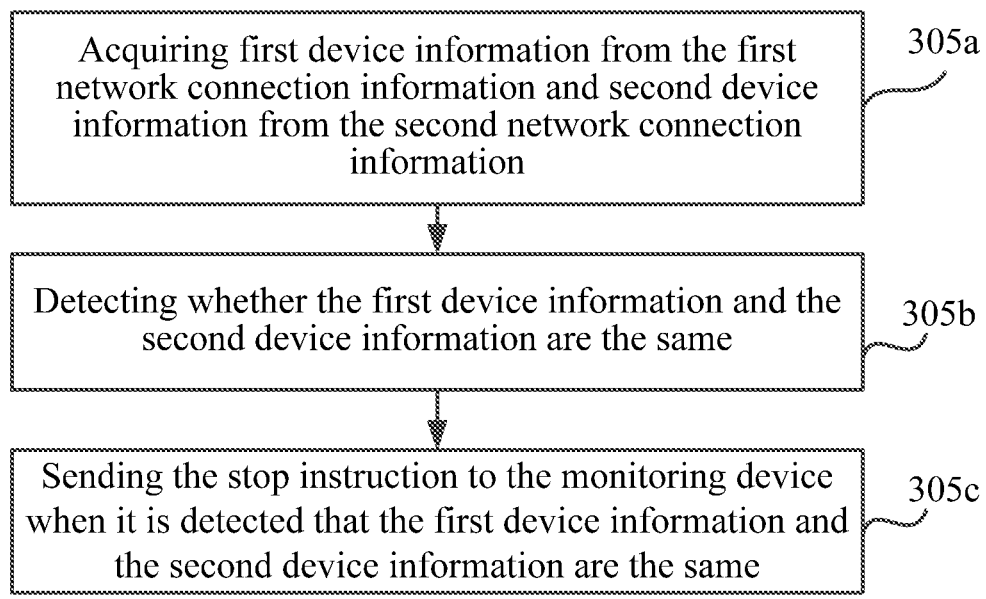
FIG. 3F is a flow chart showing a process of acquiring device information in a method for recording videos according to an exemplary embodiment.

FIG. 3F shows an example of checking the first and second network connection information and sending the stop instructions. As shown in FIG. 3F, at 305a, the server acquires first device information from the first network connection information and second device information from the second network connection information. The first device information is device information of a gateway device to which the mobile terminal is connected, and the second device information is device information of a gateway device to which the monitoring device is connected. In some embodiments, the first device information includes the MAC address and the SSID information of the gateway device to which the mobile terminal is connected. For example, the first device information is "SSID information: SSID A, MAC address: MAC A". In some embodiments, the second device information includes the MAC address of the gateway device to which the monitoring device is connected if the monitoring device is connected to the gateway device through a network cable. Alternatively, if the monitoring device is connected to the gateway device through a wireless network, the second device information includes the MAC address and the SSID information of the gateway device.

At 305b, the server detects whether the first device information and the second device are the same.

When the monitoring device is connected with the gateway device via the network cable, the server detects whether the MAC address of the gateway device to which the mobile terminal is connected and the MAC address of the gateway device to which the monitoring device is connected are the same. If the two MAC addresses are the same, it means that the mobile terminal and the monitoring device are connected to the same gateway device. If the two MAC addresses are different, it means that the mobile terminal and the monitoring device are not connected to the same gateway device.

When the monitoring device is connected with the gateway device through the wireless network, the server detects whether the SSID information of the gateway device to which the mobile terminal is connected and the SSID information of the gateway device to which the monitoring device is connected are the same. If the SSID information of the two gateway devices is different, it means that the mobile terminal and the monitoring device are not connected to the same gateway device. Since different gateway devices may set the same SSID information, if the SSID information of the two gateway devices is the same, the server further detects whether the MAC address of the gateway device to which the mobile terminal is connected and the MAC address of the gateway device to which the monitoring device is connected are the same. In this case, when the two MAC addresses are the same, it means that the mobile terminal and the monitoring device are connected to the same gateway device. When the two MAC addresses are different, it means that the mobile terminal and the monitoring device are not connected to the same gateway device.

At 305c, the server sends the stop instruction to the monitoring device when it is detected that the first device information and the second device information are the same. Correspondingly, the monitoring device stops monitoring according to the stop instruction.

Referring again to FIG. 3A, at 306, a video recording instruction is sent to the monitoring device when it is detected that the first device information and the second device are different.

At 307, the video recording instruction is sent to the monitoring device when it is detected that the mobile terminal is disconnected.

The exemplary methods for recording videos are described as being executed by the server 140 in FIG. 1. As noted above, methods consistent with embodiments of the present disclosure can also be executed by the gateway device 130 in FIG. 1. For example, the binding relationship between the mobile terminal and the monitoring device is saved in the gateway device 130. In this case, the gateway device 130 acquires the second network connection information of the monitoring device bound with the mobile terminal according to the received first network connection information, and sends the stop instruction to the monitoring device when the first network connection information matches the second network connection information. Details of implementing the methods in the gateway device 130 are similar to those described above with respect to the implementation in the server 140, and thus are omitted.

Exemplary apparatuses consistent with embodiments of the present disclosure are described below. Details of the functions of the components of these apparatuses are similar to those of the methods described above, and are thus omitted.

Figure 4:
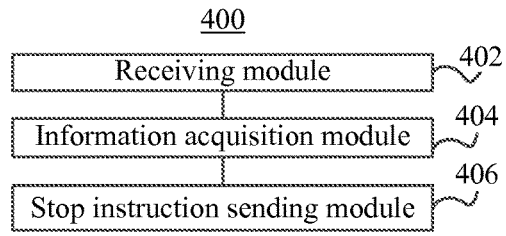
FIG. 4 is a block diagram showing an apparatus for recording videos according to an exemplary embodiment.

FIG. 4 is a block diagram showing an apparatus 400 for recording videos according to an exemplary embodiment. As shown in FIG. 4, The apparatus 400 includes a receiving module 402, an information acquisition module 404, and a stop instruction sending module 406. The receiving module 402 is configured to receive first network connection information sent by a mobile terminal. The information acquisition module 404 is configured to acquire second network connection information of a monitoring device bound with the mobile terminal according to the first network connection information received by the receiving module 402. The stop instruction sending module 406 is configured to send a stop instruction to the monitoring device if the first network connection information matches the second network connection information.

Figure 5:
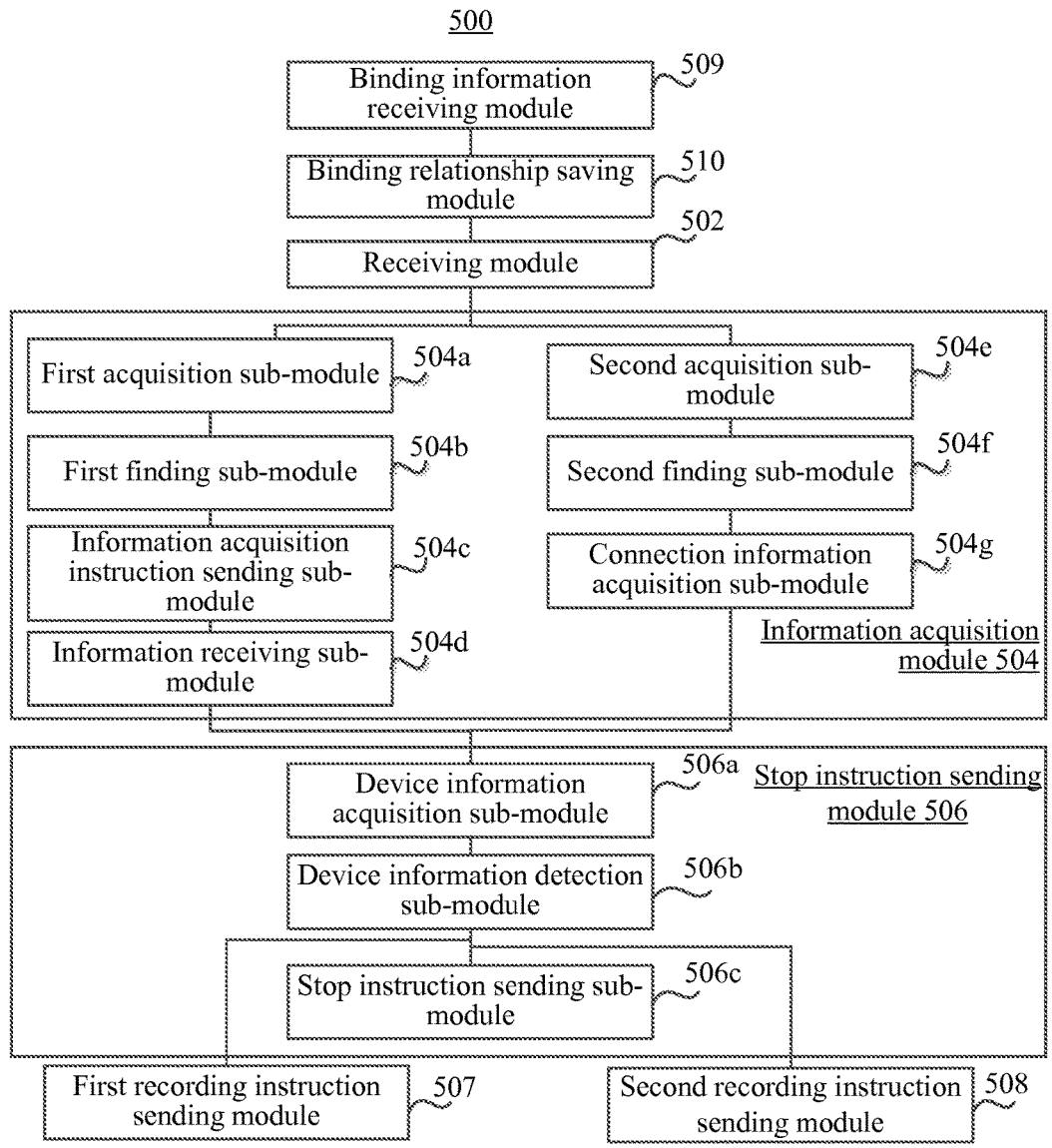
FIG. 5 is a block diagram showing an apparatus for recording videos according to another exemplary embodiment.

FIG. 5 is a block diagram showing an apparatus 500 for recording videos according to another exemplary embodiment. The apparatus 500 includes a receiving module 502, an information acquisition module 504, and a stop instruction sending module 506. The receiving module 502, the information acquisition module 504, and the stop instruction sending module 506 of the apparatus 500 are configured to perform similar functions as the receiving module 402, the information acquisition module 404, and the stop instruction sending module 406 of the apparatus 400, respectively.

In some embodiments, as shown in FIG. 5, the stop instruction sending module 506 includes a device information acquisition sub-module 506a, a device information detection sub-module 506b, and a stop instruction sending sub-module 506c. The device information acquisition sub-module 506a is configured to acquire first device information from the first network connection information and second device information from the second network connection information. The first device information is device information of a gateway device to which the mobile terminal is connected, and the second device information is device information of a gateway device to which the monitoring device is connected. The device information detection sub-module 506b is configured to detect whether the first device information and the second device information acquired by the device information acquisition sub-module 506a are the same. The stop instruction sending sub-module 506c is configured to send the stop instruction to the monitoring device when the device information detection sub-module 506b detects that the first device information and the second device information are the same.

In some embodiments, as shown in FIG. 5, the apparatus 500 further includes a first recording instruction sending module 507 or a second recording instruction sending module 508. The first recording instruction sending module 507 is configured to send a video recording instruction to the monitoring device when the device information detection sub-module 506b detects that the first device information and the second device are different. The second instruction sending module 508 is configured to send the video recording instruction to the monitoring device when the device information detection sub-module 506b detects that the mobile terminal is disconnected.

In some embodiments, as shown in FIG. 5, the information acquisition module 504 includes a first acquisition sub-module 504a, a first finding sub-module 504b, an information acquisition instruction sending sub-module 504c, and an information receiving sub-module 504d. The first acquisition sub-module 504a is configured to acquire an identification of the mobile terminal from the first network connection information. The first finding sub-module 504b is configured to find the monitoring device bound with the mobile terminal in a preset binding relationship according to the identification of the mobile terminal acquired by the first acquisition sub-module 504a. The information acquisition instruction sending sub-module 504c is configured to send instruction of acquiring the second network connection information to the bound monitoring device found by the first finding sub-module 504b. The information receiving sub-module 504d is configured to receive the second network connection information sent by the bound monitoring device found by the first finding sub-module 504b.

In some embodiments, the information acquisition module 504 further includes a second acquisition sub-module 504e, a second finding sub-module 504f, and a connection information acquisition sub-module 504g. The second acquisition sub-module 504e is configured to acquire an identification of the mobile terminal from the first network connection information. The second finding sub-module 504f is configured to find an identification of the monitoring device bound with the mobile terminal in a preset binding relationship according to the identification of the mobile terminal acquired by the second acquisition sub-module 504e. The connection information acquisition sub-module 504g is configured to acquire the second network connection information previously uploaded by the monitoring device according to the identification found by the second finding sub-module 504f. The second network connection information is uploaded when the monitoring device is initially connected or when the monitoring device detects that connection information changes.

In some embodiments, the apparatus 500 further includes a binding information receiving module 509 and a binding relationship saving module 510. The binding information receiving module 509 is configured to receive binding information sent by the mobile terminal or the monitoring device. The binding information includes the identification of the mobile terminal and the identification of the monitoring device. The binding relationship saving module 510 is configured to save the binding relationship between the mobile terminal and the monitoring device.

Figure 6:
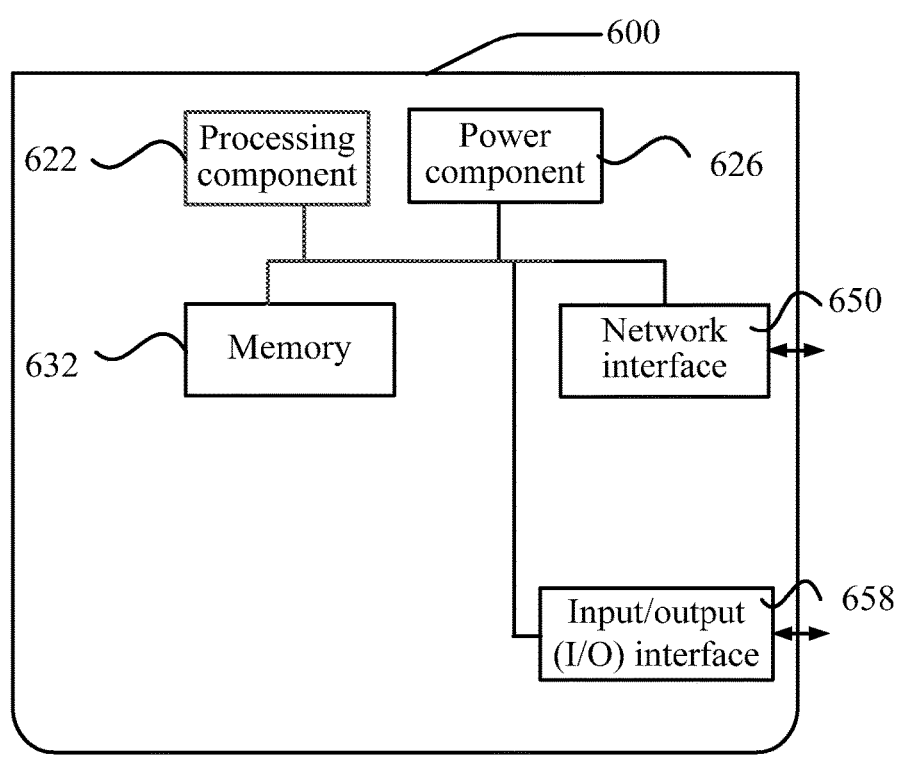
FIG. 6 is a configuration diagram showing a device for recording videos according to an exemplary embodiment.

FIG. 6 is a block diagram showing a device 600 for recording videos according to an exemplary embodiment. The device 600 includes a processing component 622 that further includes one or more processors, and memory resources represented by a memory 632 for storing instructions, such as application programs, executable by the processing component 622. The application programs stored in memory 632 may include one or more modules, each of which corresponds to a set of instructions. Moreover, the processing component 622 is configured to execute instructions for performing methods consistent with embodiments of the present disclosure.

The device 600 also includes a power component 626 configured to perform power management of the device 600, wired or wireless network interface(s) 650 configured to connect the device 600 to a network, and an input/output (I/O) interface 658. The device 600 may operate based on an operating system stored in the memory 632, such as Windows Server™, Mac OS X™, Unix™, Linux™, FreeBSD™, or the like.

After considering this description and carrying out the embodiments disclosed herein, those skilled in the art may easily anticipate other implementation aspects of the present disclosure. The present disclosure is meant to cover any variations, usage or adaptive change of these embodiments, and these variations, usage or adaptive change follow general concept of the present disclosure and include the common knowledge or the customary technical means in the technical field that is not disclosed in the present disclosure. The description and embodiments are only exemplary, and the real range and spirit of the present disclosure are defined by the following claims.

It should be understood that the present disclosure is not limited to precise structures that are described above and shown in the accompanying drawings, and may be modified and changed without departing from the range of the present disclosure. The scope of the present disclosure is only defined by the appended claims.

What is claimed is:

1. A method for recording videos, comprising:
   receiving first network connection information sent from a mobile terminal, the first network connection information including an identification of the mobile terminal;
   acquiring, according to the first network connection information, second network connection information of a bound monitoring device that is bound with the mobile terminal;
   acquiring first device information from the first network connection information and second device information from the second network connection information, the first device information being associated with a first gateway device to which the mobile terminal is connected, and the second device information being associated with a second gateway device to which the monitoring device is connected;
   detecting whether the first device information and the second device information are the same; and
   sending, when the first device information matches the second device information, a stop instruction to the monitoring device to stop recording.

2. The method according to claim 1, further comprising:
   sending a video recording instruction to the monitoring device if the first device information and the second device information are different or when it is detected that the mobile terminal is disconnected.

3. The method according to claim 1, wherein acquiring the second network connection information includes:
   acquiring the identification of the mobile terminal from the first network connection information;
   finding the bound monitoring device in a preset binding relationship according to the identification of the mobile terminal;
   sending an acquisition instruction to the bound monitoring device to acquire the second network connection information; and
   receiving the second network connection information sent from the bound monitoring device.

4. The method according to claim 1, wherein acquiring the second network connection information includes:
   acquiring a first identification of the mobile terminal from the first network connection information;
   finding a second identification of the bound monitoring device in a preset binding relationship according to the first identification; and
   acquiring the second network connection information previously uploaded by the monitoring device according to the second identification, the second network connection information being previously uploaded when the bound monitoring device is initially connected or when the bound monitoring device detects that a connection information changes.

5. The method according to claim 1, further comprising:
receiving binding information sent from at least one of the mobile terminal or the monitoring device, the binding information including the identification of the mobile terminal and an identification of the monitoring device; and
saving a binding relationship between the mobile terminal and the monitoring device according to the identification of the mobile terminal and the identification of the monitoring device.

6. A device for recording video, comprising:
a processor; and
a non-transitory computer-readable storage medium storing instructions that, when executed by the processor, cause the processor to:
receive first network connection information sent from a mobile terminal, the first network connection information including an identification of the mobile terminal;
acquire, according to the first network connection information, second network connection information of a bound monitoring device that is bound with the mobile terminal;
acquire first device information from the first network connection information and second device information from the second network connection information, the first device information being associated with a first gateway device to which the mobile terminal is connected, and the second device information being associated with a second gateway device to which the monitoring device is connected;
detect whether the first device information and the second device information are the same; and
send, when the first device information matches the second device information, a stop instruction to the monitoring device to stop recording.

7. The device according to claim 6, wherein the instructions further cause the processor to:
send a video recording instruction to the monitoring device if the first device information and the second device information are different or when it is detected that the mobile terminal is disconnected.

8. The device according to claim 6, wherein the instructions further cause the processor to:
acquire the identification of the mobile terminal from the first network connection information;
find the bound monitoring device in a preset binding relationship according to the identification of the mobile terminal;
send an acquisition instruction to the bound monitoring device to acquire the second network connection information; and
receive the second network connection information sent from the bound monitoring device.

9. The device according to claim 6, wherein the instructions further cause the processor to:
acquire a first identification of the mobile terminal from the first network connection information;
find a second identification of the bound monitoring device in a preset binding relationship according to the first identification; and
acquire the second network connection information previously uploaded by the monitoring device according to the second identification, the second network connection information being previously uploaded when the bound monitoring device is initially connected or when the bound monitoring device detects that a connection information changes.

10. The device according to claim 6, wherein the instructions further cause the processor to:
receive binding information sent from at least one of the mobile terminal or the monitoring device, the binding information including the identification of the mobile terminal and an identification of the monitoring device; and
save a binding relationship between the mobile terminal and the monitoring device according to the identification of the mobile terminal and the identification of the monitoring device.

11. A non-transitory computer-readable storage medium storing instructions that, when executed by a processor of a terminal, cause the terminal to:
receive first network connection information sent from a mobile terminal, the first network connection information including an identification of the mobile terminal;
acquire, according to the first network connection information, second network connection information of a bound monitoring device that is bound with the mobile terminal;
acquire first device information from the first network connection information and second device information from the second network connection information, the first device information being associated with a first gateway device to which the mobile terminal is connected, and the second device information being associated with a second gateway device to which the monitoring device is connected;
detect whether the first device information and the second device information are the same; and send, when the first device information matches the second device information, a stop instruction to the monitoring device to stop recording.

* * * * *